(12) United States Patent
Saad (10) Patent No.: US 11,275,506 B2
(45) Date of Patent: Mar. 15, 2022

(54) STORAGE-EFFICIENT DR FOR EDGE DEVICES

(71) Applicant: EMC IP Holding Company LLC, Hopkinton, MA (US)

(72) Inventor: Yossef Saad, Ganei Tikva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/654,422

(22) Filed: Oct. 16, 2019

(65) Prior Publication Data
US 2021/0117098 A1    Apr. 22, 2021

(51) Int. Cl.
*G06F 3/06* (2006.01)

(52) U.S. Cl.
CPC ............ *G06F 3/0608* (2013.01); *G06F 3/067* (2013.01); *G06F 3/0616* (2013.01); *G06F 3/0619* (2013.01); *G06F 3/0635* (2013.01); *G06F 3/0653* (2013.01)

(58) Field of Classification Search
None
See application file for complete search history.

(56) References Cited

U.S. PATENT DOCUMENTS

| | | | |
|---|---|---|---|
| 7,948,933 B2 * | 5/2011 | Ohayon | H04N 21/6143 370/328 |
| 2014/0355446 A1 * | 12/2014 | Altman | H04W 28/0289 370/235 |
| 2017/0251515 A1 * | 8/2017 | Altman | H04L 61/2503 |

* cited by examiner

*Primary Examiner* — Michael Alsip
(74) *Attorney, Agent, or Firm* — Workman Nydegger (57) ABSTRACT

One example method includes receiving multiple raw data streams, each of the raw data streams including data generated and/or collected by a respective IoT device, storing the data of the raw data streams, splitting the data of the raw data streams into 'N' storage data streams, and transmitting each of the storage data streams to a different respective storage node. In this example, one of the storage nodes is a production edge node that retains one of the storage data streams, and each of N−1 other storage nodes receives a respective one of the storage data streams.

18 Claims, 5 Drawing Sheets

STORAGE-EFFICIENT DR FOR EDGE DEVICES

FIELD OF THE INVENTION

Embodiments of the present invention generally relate to data protection and disaster recovery. More particularly, at least some embodiments of the invention relate to systems, hardware, software, computer-readable media, and methods for efficient storage of data for disaster recovery.

BACKGROUND

Edge computing and the so-called Internet-of-Things (IoT) devices are growing in importance. Sensors used for collecting data concerning environmental conditions are one example of IoT systems and devices. Such sensors may be employed, for example, in an industrial environment, such as a manufacturing facility, an oil rig or a warehouse. The data collected by the sensors may be analyzed to gain insights into various parameters such as efficiency, cost, or to identify bottlenecks or other problems in the industrial processes. The insights gained from the analysis may be used to improve such processes, fix faulty machinery or prevent process bottlenecks, possibly resulting in significant cost savings and improved efficiency and profits. Other examples of IoT devices include still/video feeds that monitor various activities or processes, and security surveillance cameras.

While such IoT devices generate useful data, the amount of data generated by such devices may be enormous. To take the example of a video surveillance camera, there may be a need for such a camera to record data on a frequent basis so that high resolution video may be generated. However, the large amount of data gathered presents a challenge when the need arises to protect that data, since for protection against hardware failure such as a disaster, a full copy of the data should be created. This full copy requires doubling the amount of storage needed and, thus, increasing the cost of the storage solution.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection and disaster recovery. More particularly, at least some embodiments of the invention relate to systems, hardware, software, computer-readable media, and methods for efficient storage of data for disaster recovery.

The Internet of things (IoT) may be thought of as the extension of Internet connectivity into physical devices and everyday objects. Within this category, an Industrial Internet of Things (IIoT) may include interconnected sensors, instruments, and other devices networked together with computers' industrial applications, including, but not limited to, manufacturing and energy management.

An IIoT may include, for example, sensors and other collectors of data, which may be generally referred to as devices, that feed those readings into one or more edge nodes in the factory. The edge nodes may store the data and in some cases may perform local analytics on this data before sending the data to the organization data center and/or to the cloud. The data generated in IoT could be huge, at least as high as a 1 PB per day for a single factory. When such a large amount of data is stored in an edge device or in a local server, and aggregated for several days, both storage and analysis costs can add up quickly and significantly.

The collected data must be protected however, so that if a disaster or other problem occurs, the data can be recovered. One possible approach to protect against such disaster might be to use a replication solution that will duplicate the data to another storage site. However this approach would require that the storage capacity be doubled and the cost for storage thus would grow accordingly. Moreover, regulatory or business needs may require two or three remote sites, in which case the storage capacity and cost is tripled, or even quadrupled, relative to storage of a single copy of the data. Thus, a dilemma is presented that, on one hand, there is a need to protect the data from disasters, but on the other hand, the cost of duplicating the storage capacity can be prohibitive.

With these considerations in view, at least some example embodiments of the invention embody the notion that, in the event a problem occurs, the recovery of relatively lower resolution data, rather than a full copy of the data, will be adequate in at least some circumstances. The lower resolution data thus strikes a compromise in that it is not as granular as higher resolution data, but is also less expensive to store than the higher resolution data.

In general, for a data protection configuration that has a total of N data storage sites, that is, a production site+(N−1) disaster recovery (DR) sites, a raw data stream from an IoT device is split into N streams. Once the N streams are created, each of the N sites, which has a respective available storage capacity of 1/N, receives and stores a respective one of those N streams. Thus, the aggregate storage capacity of the data storage sites is N.

In case the data may be needed at full resolution for some reason, all data from the N−1 DR sites may be read back into the production site, and the original full resolution stream may then be re-created and processed at the production site at full resolution. If there is a disaster, and any one or more of the sites are lost, the analysis may be performed based on the lower resolution data available from the remaining sites.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that data storage costs may be reduced significantly relative to the costs that would be incurred if a full copy of a dataset were required to be stored, since the collective resolution of the data stored at the DR sites may be some amount less than 100 percent, such as 50 percent for example. In some embodiments, the use of multiple DR sites in different respective failure domains may improve the likelihood that data will be available even in the event of a disaster, even if the available data may have a relatively lower resolution than the resolution of a full copy. As well, embodiments may provide for faster reassembly, at the production site, of a full copy of the dataset since the respective data stored at each of the DR sites may be streamed simultaneously to the production site. That is, such an approach may be faster than streaming a single entire copy from a single DR site to the production site.

A. Aspects of an Example Architecture and IoT Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data storage and disaster recovery operations. Such example operations may include, but are not limited to, data read/write/delete operations, data streaming operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 1:
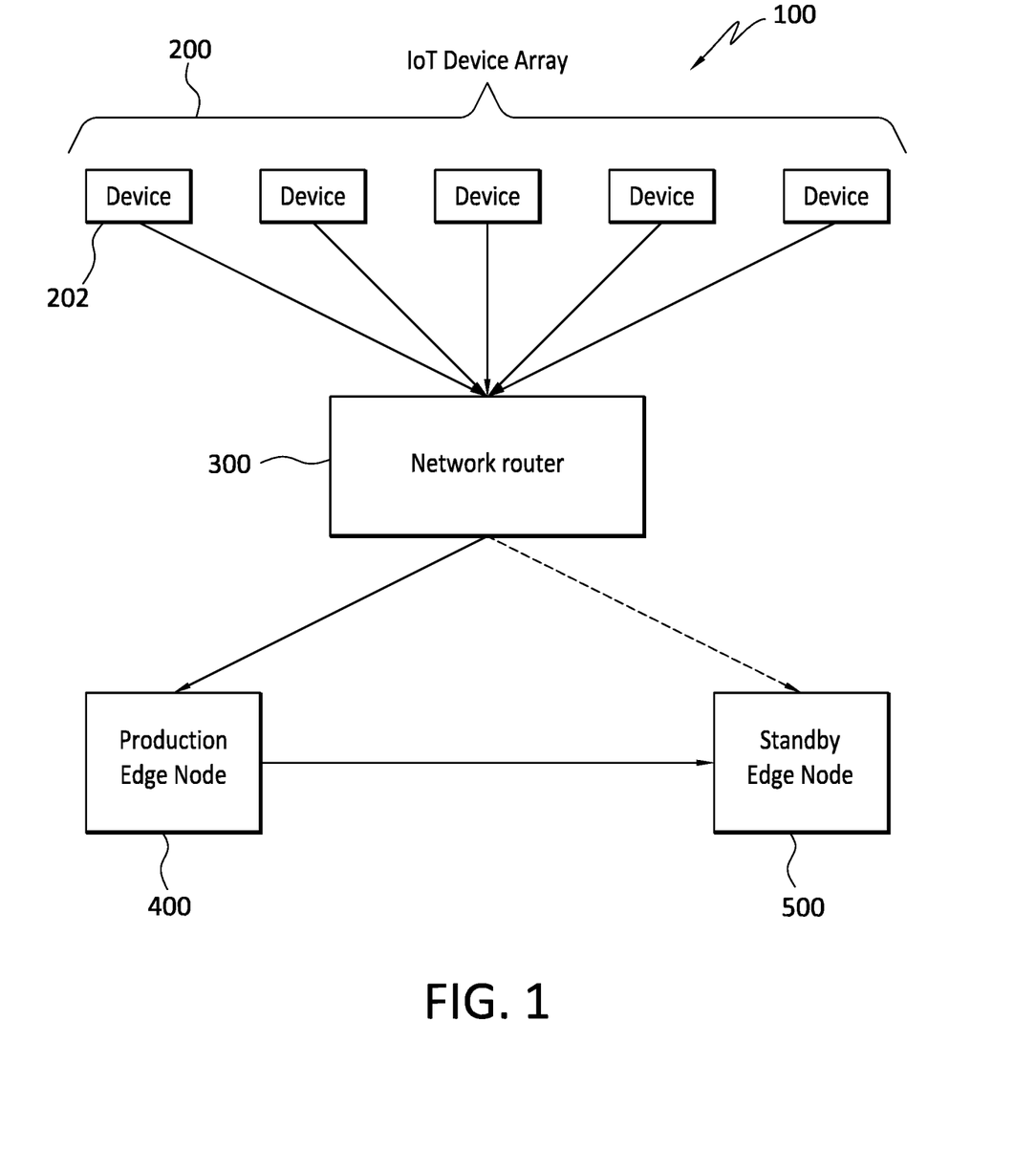
FIG. 1 discloses aspects of an example operating environment for some embodiments.

With particular attention now to FIG. 1, one example of an operating environment for embodiments of the invention is denoted generally at 100. In general, the operating environment 100 may be any environment that employs an array 200 of one or more IoT devices 202. The IoT devices may be of any type that is operable to gather and/or generate data concerning one or more parameters of interest, examples of which include, but are not limited to, measurement and/or sensing devices that are able to collect data concerning environmental conditions such as temperature, pressure, particulate counts, the presence of chemicals and contaminants, and machine operation parameters, to name a few. As indicated in FIG. 1, the example IoT devices 202 may be configured to transmit data, wirelessly and/or by a hard connection such as a wire or optical cable.

In the example of FIG. 1, the IoT devices 202 may each communicate their respective data to one or more network routers 300. After receipt of the data from the IoT devices 202, the network router 300 may then pass the received data to a production site which may comprise, or consist of, one or more production edge nodes 400. The data may then be split at the production site into two or more streams, storing one of the streams at the production site, and transmitting another of the streams to a standby site that may comprise, or consist of, one or more standby edge nodes 500. In at least some embodiments, the standby site may be in a different fault domain than the fault domain that includes the production site, such that if one or the other of the standby site or production site should fail, the operation of the remaining site(s) is not compromised by that failure. Thus, for example, in order to achieve disaster recovery capability, two edge nodes, such as a production edge node and a standby edge node for example, will be installed in two separate and independent fault domains. Those domains may be located close to each other, such as several miles apart. Further information concerning some example data splitting and distribution schemes is provided elsewhere herein.

C. Example Host and Server Configurations

Figure 2:
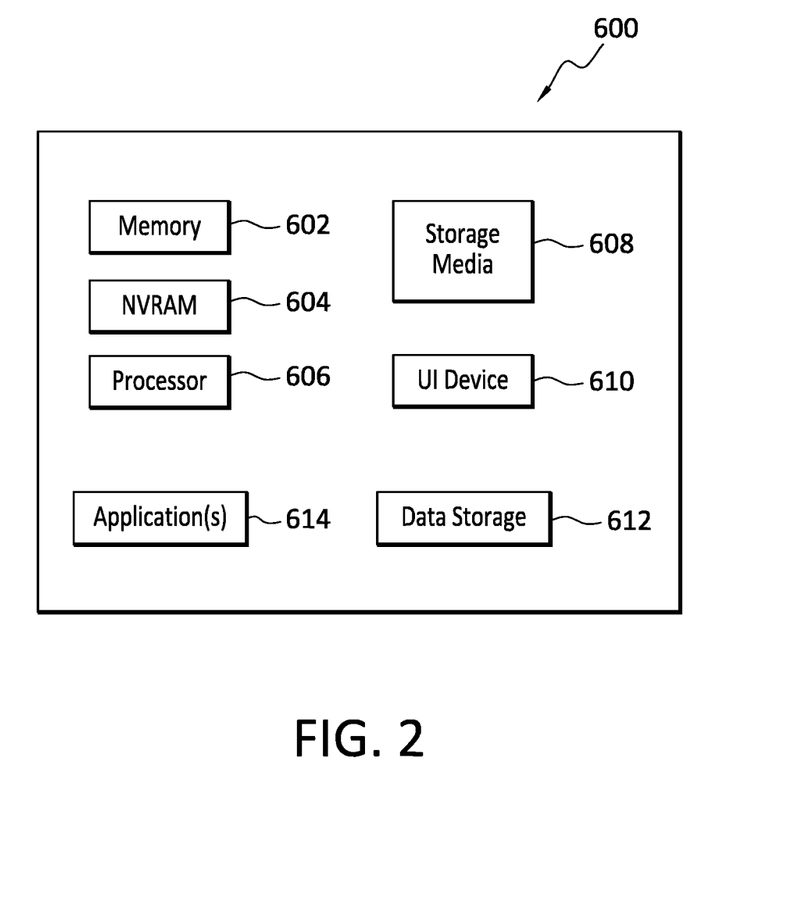
FIG. 2 discloses aspects of an example host device.

With reference briefly now to FIG. 2, any one or more of the entities disclosed in connection with FIG. 1 may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 2.

In the example of FIG. 2, the physical computing device 600 includes a memory 602 which may include one, some, or all, of random access memory (RAM), non-volatile random access memory (NVRAM) 604, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Thus, such executable instructions may take various forms. Such forms include, but are not limited to, instructions executable to perform any one or more of data collection, data stream generation, data transmission, data collection, data stream splitting, data storage, data backup, data restoration, data assembly, and data analysis.

D. Example Data Splitting Schemes

As noted earlier, embodiments of the invention provide that a stream, dataset, or any other grouping of data, may be split into multiple parts, each of which may be stored at a respective site, where each of the sites may reside within a respective fault domain. The data splitting function may be performed at one or more nodes, examples of which include production edge nodes, and standby edge nodes.

In general, a concept for a data splitting scheme according to some example embodiments may be articulated as follows: in order to have a data protection configuration of a total N sites (i.e., production site+(N−1) DR sites), take the raw data stream from a device that creates it, such as an IoT device for example, and split that data stream into N streams, each of which is stored at a respective one of the N sites. In some embodiments, a raw data stream may comprise uncompressed data. More generally, a 'raw' data stream may be used herein to refer to the data stream generated by an IoT device, while a 'storage' data stream may be used herein to refer to a data stream generated by a production node, or other node, for transfer to a storage node, and to refer to a data stream received from a storage node. Following is one example approach:

For IoT sensor readings of frequency f, have N streams of readings, each with frequency of f/N.
For still pictures, N may be 2 or 4—have the picture be split into 2 or 4 streams:
2 streams—one stream includes all odd rows of the image, and the other has all even rows of the image (similar to "fields" in interlaced mode)
4 streams—split every block of 4 pixels into four separate streams, i.e.:
Stream 1—pixels in odd-row/odd-column
Stream 2—pixels in odd-row/even-column
Stream 3—pixels in even-row/odd-column
Stream 4—pixels in even-row/even-column
For video streams, take every Nth frame to create the N streams at 1/N frequency (frame rate).

As the foregoing examples illustrate, a variety of approaches may be taken with respect to data splitting. In at least some embodiments, the manner of splitting data may be based upon the particular type of data involved, such as video data, still picture data, voice data, or any other data type(s), and combinations of these. Moreover, the number N of streams selected in a particular circumstance may likewise be based on data type and/or other data characteristics, and/or based on other considerations such as a minimum acceptable level of data resolution.

Once the N streams are created, each storage site gets only one stream, which requires only 1/N of the overall storage capacity. In case the data is required at full resolution, all data may be read back into the production site, the original full resolution stream re-created, and then processed at the production site at full resolution. If there is a disaster and one or more sites are lost, one of which may be the production site, the analysis will be performed based on the lower resolution data available. To illustrate, if any four out of ten total sites are lost, the analysis may be performed on the remaining data set, which is at 60 percent of the resolution of the entire dataset, that is, (10−4)/10. That resolution may, or may not, be acceptably high.

Another factor that may influence the usability of the available data in a DR scenario is the particular manner in which the data was split. For example, the alternating odd/even splits noted above may produce a data granularity that lends itself to analysis. On the other hand, if the data stream is split into groups of 100 data blocks, such that the first 100 blocks goes to one node, and the next 100 blocks goes to another node, such a splitting scheme produces a granularity in the data that may not support analysis even though when the available data is viewed in the aggregate, the resolution of the available data may be at an acceptable level.

Thus, when data is split, consideration may be given to multiple variables. One of the variables may be the minimum acceptable resolution, which may be a basis for determining or deciding what the value should be for N. Another of the variables may be the particular manner in which the data is split. It should be noted that data analysis may be omitted in a case where it is determined that the resolution of a remaining dataset, that is, the data available after a disaster, is not high enough that the data may serve as an adequate basis for analysis.

It will be appreciated that variations on the disclosed embodiments are possible. In one embodiment, the storage capacity is maintained at 100% of the stored data, by splitting all the data across the sites. However, this means that in normal circumstances, analysis at the production site requires that data be sent back and forth between the production site and the standby sites. Thus, an alternative approach that may reduce the transmission of data between the production site and the standby sites would be to have the production site still keep the full resolution (100%), but the DR sites would collectively hold less than a full copy of the data.

The following examples are illustrative. In the case where there is a production site and only one standby edge node, the production site may hold a full copy of the data, but the standby edge node may hold only a 50 percent resolution copy of the data, that is, only half the data, or 1/N, where N is 2. Thus, the total storage capacity needed in this case would be 150% for 2 sites, instead of the 200% that would be needed if a full redundant copy were stored at the standby edge node. Similarly, if a total of three nodes were provided, that is, N=3, the production site may hold a full copy of the data, but each of the other two nodes would store 1/N, or ⅓ in this example, of the full data set. Thus, the total storage capacity needed would be 100+33+33, or 166%, instead of the 300% that would be needed if three full copies were stored. In general then, increasing the number of storage nodes improves recoverability in the event of a disaster since the data is distributed over a larger number of nodes, and also reduces the amount of storage capacity needed. However, depending upon the circumstances in a particular case, there may sometimes be a practical limit to the extent to which the total number of nodes may be scaled out.

Another illustrative example involves IIoT sensor data, and a total of 2 storage nodes. In this example, data from the sensors is received as a stream of data, according to specific scheduled monitoring of the sensors. Such readings are shown in FIG. 1 as $D_n$, representing the nth reading. Although the readings are continuously generated every T seconds and may be practically infinite at least in theory, IIoT systems may, as a practical matter, limit the amount of history they maintain to N readings, where N may be determined by the vendor/user. If each reading is the size of L bytes, then the storage capacity 'C' required in the edge device in this two node scenario is: C=N*L bytes.

Figure 3:
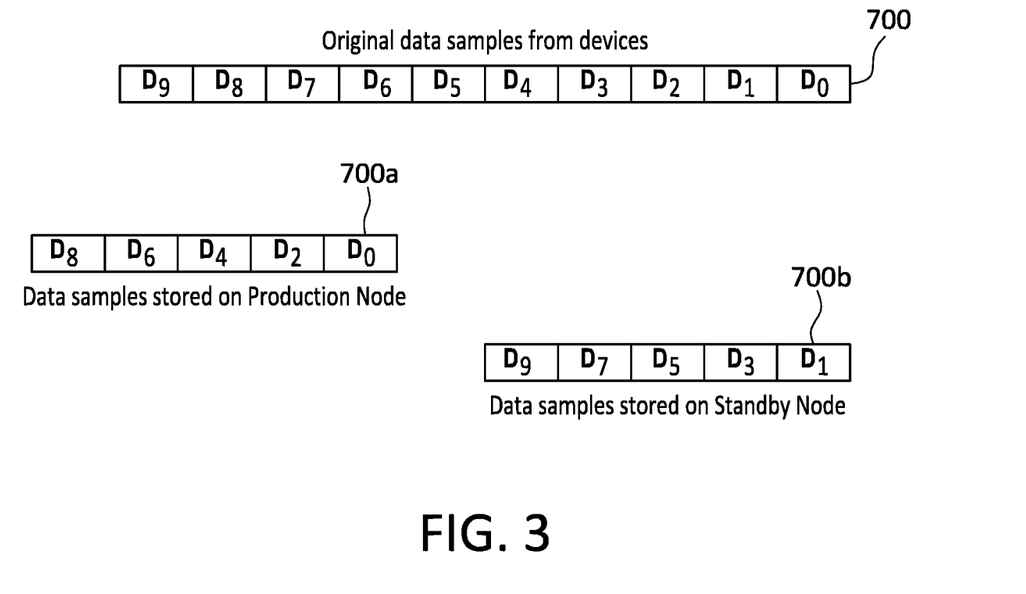
FIG. 3 discloses aspects of an example data splitting scheme.

With attention now to FIG. 3, details are provided concerning one example scheme for splitting data in accordance with an embodiment of the invention. As indicated, one or more devices such as an IoT device may generate a group of data samples 700. In the illustrated example, the group of data samples 700 includes ten data samples. However, a group of data samples may include any number of data samples, and the group of data samples 700 of FIG. 3 is presented only by way of illustration.

The group of data samples 700 generated by the device(s) may subsequently be split into N groups. In the example of FIG. 3, N is set at 2, such that two groups of samples, 700a and 700b, are created from the initial group of data samples 700. Group 700a includes five even-numbered samples $D_0$, $D_2$, $D_4$, $D_6$ and $D_8$, while group 700b includes five odd-numbered samples $D_1$, $D_3$, $D_5$, $D_7$ and $D_9$. More generally stated, all even numbered samples ($D_{2i}$, i=0 ... N/2) will be stored on the production node, and all odd numbered samples ($D_{2i+1}$, i=0 ... N/2) will be sent to the standby node and stored there. Thus, in this example, each node stores 50 percent of the dataset. Put another way, each node has half the storage capacity that would be needed to store the entire dataset.

It will be appreciated however, that a data grouping may be split into any number N of sub-groups, on any basis or bases, and as such, the relatively simple splitting scheme disclosed in FIG. 3 is presented only by way of example. Examples of other bases for splitting a data grouping include, but are not limited to, data parameters and characteristics such as size, timestamp, data type, and combinations of these.

With continued reference to FIG. 3, it can be seen that the groups 700a and 700b are stored at different nodes, such as a production node and a standby node, respectively. In this example, each of the two nodes has only half of the required storage capacity 'C' that is needed for the entire group of data samples 700, that is, the capacity of each of these nodes is C/2.

Thus, if the production node were to fail for any reason, the data in group 700b would still be available from the standby node, which may also be referred to herein as a DR node. However, since only half the data is available, that is, the five odd-numbered samples of group 700b, the available data may be considered has having 50 percent resolution, that is, 5/10 of the entire data set 700 is available after the production node has failed.

While the available dataset thus has a lower resolution than the entire dataset considered as a whole, a resolution of 50 percent may be acceptable in some circumstances. More generally then, the number N of groups, and corresponding DR nodes, may be selected based on parameters including, but not limited to, the lowest acceptable resolution of a dataset, and the likelihood that any 'X' number of nodes will be in a failure state at any one time. To briefly illustrate with another example, if there is an expectation that, in a group of undetermined size, a maximum of 2 nodes may/would fail, and a data resolution of at least 70 percent is desired, then the number N of nodes/groups would be at least 7, since (7−2)/7=0.71.

Operationally, and with continued reference to the examples of FIGS. 1 and 3, in case the production edge node 400 needs to perform any analysis on the data, it may retrieve the required samples from both itself and from the standby edge node 500, which may be close enough in a high-speed network, to create the full, high resolution data set. However, should the production edge node 400 become unavailable due to a disaster or other problem, the standby edge node 500 may become active in response, such that:

The router 300 may start sending the data from the IoT devices 202 to the standby edge node 500. This standby edge node 500 may store only half the data, such as the odd samples (see FIG. 3), since the standby edge node 500 does not have enough storage capacity for all the data, and cannot send the even samples (see FIG. 3) to the failed production edge node 400.

Any analysis performed now by the standby edge node 500 may thus use only half the data of the full dataset, which is the same data but at lower resolution, that is, a reading every 2T seconds. The analytics results may still be valid and relevant to continuously improve the factory operation, although the resolution and accuracy of the results may be lower. Some degradation in accuracy may be acceptable however, and offset to some extent at least by the reduction in storage costs that may be achieved by using less storage space.

When the production edge node 400 returns to full operation, the router 300 may be notified and then revert to send IoT device 202 data to the production edge node 400 and operation resumes as usual. In case the data received by the production edge node 400 and/or the standby edge node 500 is uploaded to the cloud once occasionally, then in case of a disaster, the historical data residing in the cloud may be sent at the lower resolution but will still be valuable and relevant for analytics.

D. Example Methods

Figure 4:
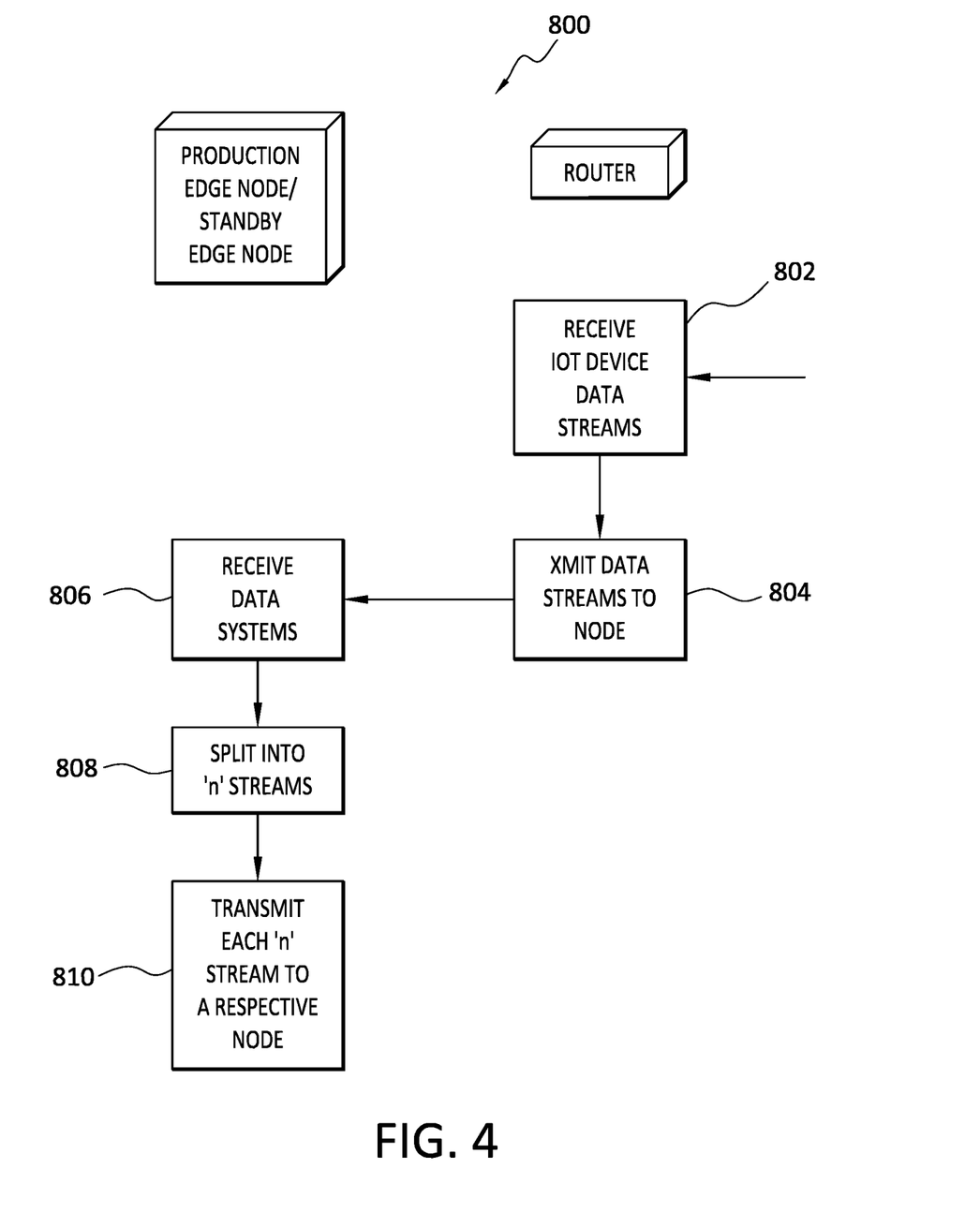
FIG. 4 discloses aspects of an example method for data splitting and storage.

With reference next to FIG. 4, methods for implementing a data storage configuration and data storage process are disclosed, where one example method is denoted generally at 800. The method 800 may be performed by a production edge node at a production site, or in the event the production site is down for any reason, the method 800 may be performed by a standby edge node at a standby site. As well, the method 800 may be performed by the production edge node (or standby edge node) for a period of time, and if/when the production edge node (or standby edge node) goes down, performance of the method 800 can be handed off to the standby edge node (or production edge node, as applicable). More generally, the scope of the invention is not limited to performance of the method 800 by any particular entity, or entities, and the foregoing are provided only by way of example.

The method 800 may begin at 802 when an entity such as a router for example, receives respective data streams from one or more IoT devices. One or more of the IoT data streams may be received 802, and transmitted 804, by the router in real time. In some other embodiments, the router or other device may perform some processing on the data streams received from the IoT devices before transmitting 804 the data to a node. Such processing may include, for example, collecting data from a particular IoT device, or devices, until a set amount of data has been received from that IoT device, or devices, and then passing 804 the collected data all at once to the node. In some embodiments then, the node receives data indirectly from the IoT devices by way of the router, while in other embodiments, the node may receive data directly from one or more of the IoT devices. Thus, receipt of IoT data by the node may be either direct or indirect receipt of that data.

In general, the router or other device transmits one or more data streams 804 to a node based on instructions received by the router, and/or based on pre-programmed scenarios. For example, if the router is transmitting data 804 to a primary node that later fails or experiences some type of problem, the router may, upon a notification as to the occurrence of the failure or problem, immediately begin redirecting the data 804 to another, secondary, node that is functional. Upon restoration of the primary node to a functional state, and notification to the router to that effect, the router may immediately begin transmitting the data 804 to the primary node. Any data intended for the primary node, but directed to the secondary node due to a problem at the primary node, may be migrated from the secondary node to the primary node after the functionality of the primary node has been restored.

The data transmitted 804 by the router or other device is then received 806 at a node, such as a production edge node, or a standby edge node, for example. The receiving node then splits 808 the data into 'N' streams, where N is an integer >1. In some embodiments, N is the total number of sites across which the received data will be stored. For example, N may be=1 production site+(N−1) DR sites. Depending upon the embodiment, the data may be split 808 on a per-IoT device basis so that, for example, a data stream from a particular IoT device will be distributed across the N devices.

Some embodiments are configured so that a full copy of a data set of interest is collectively maintained across the N sites. That is, a full copy of the dataset resides at the production node, while another full copy of the dataset is spread across the N sites, with the result that two full copies of the dataset are provided. Put another way, the N sites collectively provide capacity for storage of 100 percent of the dataset. Thus, the N data streams would add up to 100 percent of the dataset at the production site, so that a total storage capacity of 200 percent is needed. Other embodiments are configured differently.

As discussed elsewhere herein, it may be the case that storage of a copy of the entire dataset is not needed and 50 percent, for example, of the entire dataset is adequate to support analyses or other processes involving the data. In this case, only odd, or even, samples collected by, or from, the IoT devices are retained for DR purposes. Thus, the total storage capacity that is needed with respect to the collected data is only 150 percent, rather than the 200 percent that would be needed for the data set+ one full copy of the dataset. That is, in this example, a full copy of the dataset resides at the production node, for example, but a copy of only half of the dataset is distributed among N storage nodes. Thus, a savings in storage capacity, and associated cost, may be realized in this example case.

Other example data splitting scenarios and data storage scenarios are disclosed elsewhere herein. In general, the splitting of data may be performed as a function of variables including, but not limited to, the type(s) of analyses expected to be performed with respect to the data, the availability of storage, the cost of storage, the type of data being split, the amount of data to be split, and the number of storage nodes available.

With continued reference to FIG. 4, after the data has been split 808 into 'N' data streams, each of the 'N' streams may be transmitted 810 to a respective storage node. Each of the N storage nodes may reside in a respective failure domain. In some embodiments, all of the storage nodes reside in a first failure domain, while the production site resides in a second failure domain that is isolated from the first failure domain. As a result of performance of the method 800, and particularly the splitting 808 and transmission 810 processes, a full, or partial, copy of a dataset that resides at a production site is distributed amongst the N storage nodes. That is, each of the storage nodes has 1/N of the overall storage capacity, and receives a stream of data that is proportionately sized. Thus, if the production site, and/or any of the storage nodes, fails for any reason, there may be adequate data still available at the remaining functional sites to support the performance of analyses and/or other processes concerning the data.

It is noted that the manner in which data is collected, and/or the entities that perform the data collection, may vary in different embodiments. Thus, in some embodiments, variables including, but not limited to, the type, frequency, and amount of data, to be gathered can be controlled in whole, or in part, by the IoT devices. That is, for example, the IoT devices may be programmed according to any combination of the aforementioned variables and/or other variables, and the collected and/or generated data transmitted to a device such as a router. This approach may be useful where an IoT device generates/collects data continuously, such as every 'T' seconds, where T can be any number. In this way, only the type, amount, and frequency, for example, of data that is actually needed is passed on from the IoT device to the router, and the production site does not have to devote processing resources to the task of performing these processes for each IoT device.

Figure 5:
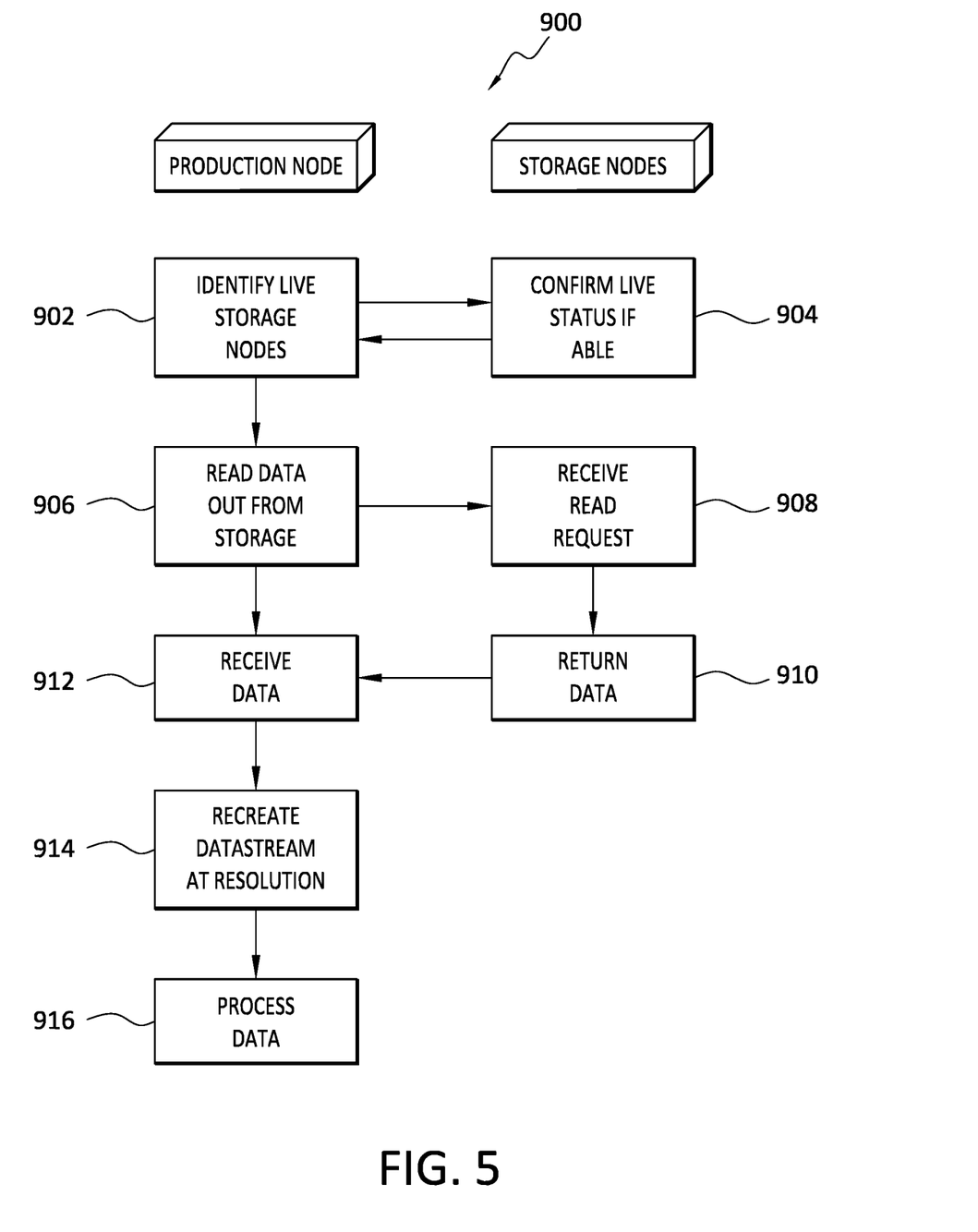
FIG. 5 discloses aspects of an example restore process.

Turning now to FIG. 5, details are provided concerning processes for restoring data from one or more storage nodes, one example of which is denoted generally at 900. While FIG. 5 refers to a production node and a storage node, each associated with particular operations, the scope of the invention is not so limited. For example, any of the processes associated with the production node may be performed by a storage node and, likewise, any of the processes associated with the storage node may be performed by a production node. Thus, the arrangement disclosed in FIG. 5 is presented only by way of example, and not limitation.

The example method 900 may be performed, for example, in response to an event such as a request that an analysis of a dataset, or a portion thereof, be performed. Additionally, or alternatively, the example method 900 may be performed in response to a request that a dataset, or portion thereof, be assembled from one or more storage nodes. More generally, the method 900 can be performed at any time and/or in response to the occurrence, or non-occurrence, of any event, including the passage of a predetermined amount of time.

The example method 900 may begin when a first node, such as a production node for example, attempts to identify 902, for a group of nodes that collectively store a dataset of interest, which of those nodes are operational that is, which node(s) is/are able to support a request for data stored at the node. This check may involve, in some embodiments, the use of a heartbeat signal or similar mechanism sent by the production node to the storage nodes. Storage nodes that reply 904 to the heartbeat signal are deemed to be operational, while storage nodes that do not respond are assumed to be failed. In other embodiments, the storage nodes may each send a periodic heartbeat signal to the production node and/or to each other, so that any node can determine which of the other nodes are live or failed. Any other mechanism or method for ascertaining the live/failed status of a node may alternatively be used however.

After the live storage node(s) have been identified 902, the respective portions of the dataset residing at the various storage nodes is read out 906. Particularly, the storage nodes receive the read request 908 and return 910 their respective portions of the dataset to the requestor. As suggested above, it may be the case in some instances that one or more storage nodes are in a failed state, such that the collective body of data returned 910 has a resolution lower than would be the case if all the relevant storage nodes were functional. Thus, upon receipt 912 of the data, or at 902, the production node may perform a check to see whether the expected resolution of the returned data is adequate to support analysis or other processes. If the expected resolution is below a desired threshold, the method 900 may stop. However, if the expected resolution is at or above the desired threshold, the method 900 may proceed to 914 where the data stream is recreated using the data received from the various storage nodes. Because the recreated data stream has the desired resolution, the data stream may then be processed 916.

As noted herein, such processing 916 may comprise, but is not limited to, analysis of the data to identify problems or anomalies with industrial systems, equipment, and environments. More generally however, the processing 916 may comprise analysis of data of any type, and for any purpose. Thus, the scope of the invention is not limited to the disclosed examples.

E. Further Example Embodiments

Following are some further example embodiments of the invention. These are presented only by way of example and are not intended to limit the scope of the invention in any way.

Embodiment 1. A method, comprising: receiving a plurality of raw data streams, each of the raw data streams comprising data generated and/or collected by a respective IoT device; storing the data of the raw data streams; splitting the data of the raw data streams into 'N' storage data streams; and transmitting each of N−1 of the storage data streams to a different respective storage node.

Embodiment 2. The method as recited in embodiment 1, wherein one of the raw data streams comprised uncompressed data.

Embodiment 3. The method as recited in any of embodiments 1-2, wherein an aggregate size of data of all the storage data streams is smaller than an aggregate size of data of all the raw data streams.

Embodiment 4. The method as recited in any of embodiments 1-3, wherein the respective storage nodes collectively lack the storage capacity to store aggregate data of all the raw data streams.

Embodiment 5. The method as recited in any of embodiments 1-4, wherein an aggregate resolution of the combined data of all the storage data streams is less than 100 percent.

Embodiment 6. The method as recited in any of embodiments 1-5, wherein the stored raw data has an aggregate resolution of 100 percent.

Embodiment 7. The method as recited in any of embodiments 1-6, wherein the method is performed at a production edge node, or a standby edge node.

Embodiment 8. The method as recited in any of embodiments 1-7, wherein a node from which the storage data streams are transmitted is in a failure domain that is different than a failure domain that includes one or more of the storage nodes.

Embodiment 9. The method as recited in any of embodiments 1-8, wherein the operations further comprise performing an analysis of the data to identify a problem with a device, environment, or system monitored by one of the IoT devices.

Embodiment 10. The method as recited in any of embodiments 1-9, wherein one of the storage data streams is retained at the entity that transmits the other storage data streams.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving, at a router, a plurality of raw data streams, each of the raw data streams comprising data generated and/or collected by a respective IoT (Internet of Things) device;
   after receipt at the router of the raw data streams, transmitting, by the router to an edge node, the data of the raw data streams;
   after transmission by the router of the data of the raw data streams, storing, at the edge node, the data of the raw data streams;
   after storing the data of the raw data streams at the edge node, splitting, at the edge node, the data of the raw data streams into 'N' storage data streams;
   after the splitting of the data of the raw data streams, transmitting, from the edge node, each of N−1 of the storage data streams to a different respective storage node and retaining, at the edge node, N−(N−1) storage data streams, wherein the N−1 storage nodes each comprise a respective disaster recovery site; and
   restoring, in response to occurrence of a disaster, the data of one or more of the raw data streams from the disaster recovery sites into a production site and performing, at the production site, an analysis of the restored data to identify a problem with a device, environment, or system monitored by one of the IoT devices.

2. The method as recited in claim 1, wherein an aggregate size of data of all the storage data streams is smaller than an aggregate size of data of all the raw data streams.

3. The method as recited in claim 1, wherein the respective storage nodes collectively lack the storage capacity to store aggregate data of all the raw data streams.

4. The method as recited in claim 1, wherein an aggregate resolution of the combined data of all the storage data streams is less than 100 percent.

5. The method as recited in claim 1, wherein the stored raw data has an aggregate resolution of 100 percent.

6. The method as recited in claim 1, wherein the edge node is either a production edge node, or a standby edge node.

7. The method as recited in claim 1, wherein a node from which the storage data streams are transmitted is in a failure domain that is different than a failure domain that includes one or more of the storage nodes.

8. The method as recited in claim 1, wherein the restoring the data of one or more of the raw data streams comprises restoring less than all of the data of the raw data streams, such that the analysis is performed on less than all of the data of the raw data streams.

9. The method as recited in claim 1, wherein the data stored at the storage nodes is retrievable in connection with performance of a restore process.

10. A non-transitory storage medium having stored therein instructions that are executable by one or more hardware processors to perform operations comprising:
    receiving, at a router, a plurality of raw data streams, each of the raw data streams comprising data generated and/or collected by a respective IoT (Internet of Things) device;
    after receipt at the router of the raw data streams, transmitting, by the router to an edge node, the data of the raw data streams;
    after transmission by the router of the data of the raw data streams, storing, at the edge node, the data of the raw data streams;
    after storing the data of the raw data streams at the edge node, splitting, at the edge node, the data of the raw data streams into 'N' storage data streams;
    after the splitting of the data of the raw data streams, transmitting, from the edge node, each of N−1 of the storage data streams to a different respective storage node and retaining, at the edge node, N−(N−1) storage data streams, wherein the N−1 storage nodes each comprise a respective disaster recovery site; and
    restoring, in response to occurrence of a disaster, the data of one or more of the raw data streams from the disaster recovery sites into a production site and performing, at the production site, an analysis of the restored data to identify a problem with a device, environment, or system monitored by one of the IoT devices.

11. The non-transitory storage medium as recited in claim 10, wherein an aggregate size of data of all the storage data streams is smaller than an aggregate size of data of all the raw data streams.

12. The non-transitory storage medium as recited in claim 10, wherein the respective storage nodes collectively lack the storage capacity to store aggregate data of all the raw data streams.

13. The non-transitory storage medium as recited in claim 10, wherein an aggregate resolution of the combined data of all the storage data streams is less than 100 percent.

14. The non-transitory storage medium as recited in claim 10, wherein the stored raw data has an aggregate resolution of 100 percent.

15. The non-transitory storage medium as recited in claim 10, wherein the edge node is either a production edge node, or a standby edge node.

16. The non-transitory storage medium as recited in claim 10, wherein a node from which the storage data streams are transmitted is in a failure domain that is different than a failure domain that includes one or more of the storage nodes.

17. The non-transitory storage medium as recited in claim 10, wherein the restoring the data of one or more of the raw data streams comprises restoring less than all of the data of the raw data streams, such that the analysis is performed on less than all of the data of the raw data streams.

18. The non-transitory storage medium as recited in claim 10, wherein the data stored at the storage nodes is retrievable in connection with performance of a restore process.

\* \* \* \* \*